3,537,734
BALL JOINT
Rudolf Gottschald, deceased, late of Osterath, Germany, by Erika Gottschald, heiress, Am Meerbusch 4, Osterath, Germany
Filed July 22, 1968, Ser. No. 777,516
Claims priority, application Germany, July 21, 1967, E 25,479
(Filed under Rule 47(b) and 35 U.S.C. 118)
Int. Cl. F16c *11/06*
U.S. Cl. 287—87                                4 Claims

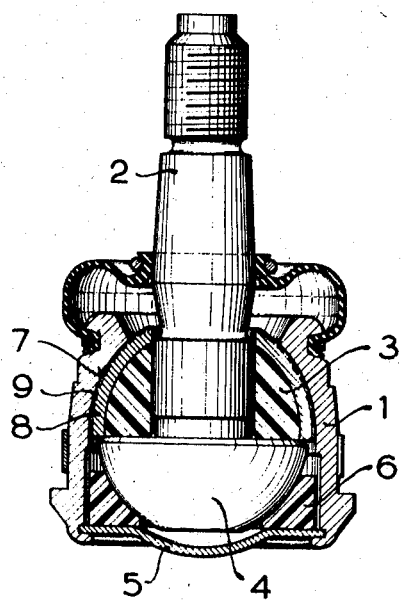

ABSTRACT OF THE DISCLOSURE

A ball and socket joint having a bearing body of polyurethane in the form of a substantially hemispherical segment. A bearing cup of steel engaging the hemispherical segment is provided. The outside surface of the cup is plated with a porous metal and engages the inner surface of the housing. The porous metal has its pores filled with polytetrafluorethylene or a plastic material on a polyoxymethylene base.

---

The present invention relates to a ball joint, preferably a suspended ball joint, especially to be used in motor vehicles, comprising a joint case and a joint pin which is supported in a hollow ball surface of the joint case via a ball head, preferably in the form of a spherical segment of plastic material passed by the joint pin which is supported on the flat surface of said segment by means of a collar.

It is the main object of the present invention to design the joint such that improved dimensional stability of the bearing will be obtained despite of the pairing of steel and plastic material as bearing surfaces.

According to the present invention this aim has been achieved in that a composite ball cup has been provided between the hollow ball surface of the joint case and the ball head, said cup comprising an interior steel cup with an exterior plating of porous bronze and a pore filling of plastic material, and more particularly of polytetrafluorethylene or Delrin (registered trademark) or plastic material on a polyoxymethylene basis respectively.

Due to plating with porous bronze which has been filled with plastic material, an otherwise not obtainable between plastic material and steel has been achieved by the present invention.

It has been achieved that in the presence of a dimensionally stable bearing the angular movements of the joint pin are easily effected at a minor frictional resistance, while the rotary movements are also taking place on paired plastic and steel surfaces resulting, for instance, in improved guiding properties in the case of steering linkages where at the same time the behavior of the steering linkage is subject to improvement. It is an especially favorable feature that the intermediate bearing cup is a uniform part easily to be manufactured from prefabricated material, the properties of which will also assist to improve the service-free attendance of the joint, and that the joint is without any play while requirements as to exact production are not too strict.

Favorably, the rim of the intermediate cup opening which is passed by the joint pin, extends towards the joint pin.

The drawing shows an embodiment of the present invention illustrating a vertical view of a suspended ball joint.

Within the joint case 1 the joint pin 2 is supported such that it is universally movable. Said joint pin passes the spherical segment 3 which may consist of plastic material such as polyurethane with an interlaced structure. The collar 4 of the joint pin is supported on the flat surface of said segments; in the drawing said collar is a hemisphere which, together with the spherical segment, forms a ball. The case will be covered by the rolled-in lid 5. An elastic ring 6 has been provided between the ball surface of the collar 4 and said lid.

On the side where the joint pin 2 leaves the joint case the same has been provided with a hollow ball surface 7 to support the spherical segment. Said segment is supported in the hollow ball surface via a composite ball cup which is the essential feature of the present invention. Said composite ball cup comprises an interior steel cup 8 the outside of which has been plated with a porous metal 9, especially porous bronze. Said porous bronze has been provided with a pore filling of polytetrafluorethylene or Delrin (registered trademark) so that, despite of the elasticity due to the face that the spherical segment 3 has been made from plastic material, the segment will be dimensionally stable in the hollow ball surface of the joint case and that, despite such dimensional stability, plastic material and steel have been paired as bearing surfaces for the support of the hollow ball surface of the joint case.

What is claimed is:
1. A ball and socket joint comprising:
   (a) a housing having a substantially spherical inner surface and an opening an one end,
   (b) a joint pin having a head with a substantially hemispherical surface thereon, said head having a flat undersurface and positioned within said housing, said joint pin extending out of said opening,
   (c) an elastic means in said housing engaging said substantially hemispherical surface,
   (d) a bearing body of polyurethane in the form of a substantially hemispherical segment having a flat surface thereon and a hole therethrough,
   (e) a bearing cup of steel engaging said substantially hemispherical segment, the outside surface of said cup being plated with a porous metal and engaging the inner surface of said housing,
   (f) said porous metal having its pores filled with polytetrafluorethylene,
   (g) wherein said flat undersurface of said head engages the flat surface of said bearing body and said joint pin extends through said hole.
2. A ball and socket joint as defined in claim 1 wherein said porous metal is porous bronze.
3. A ball and socket joint comprising:
   (a) a housing having a substantially spherical inner surface and an opening at one end,
   (b) a joint pin having a head with a substantially hemispherical surface thereon, said head having a flat undersurface and positioned within said housing, said joint pin extending out of said opening,
   (c) an elastic means in said housing engaging said substantially hemispherical surface,
   (d) a bearing body of polyurethane in the form of a substantially hemispherical segment having a flat surface thereon and a hole therethrough,
   (e) a bearing cup of steel engaging said substantially hemispherical segment, the outside surface of said cup being plated with a porous metal and engaging the inner surface of said housing,

(f) said porous metal having its pores filled with a plastic material on a polyoxymethylene base, (g) wherein said flat undersurface of said head engages the flat surface of said bearing body and said joint pin extends through said hole.

4. A ball and socket joint as defined in claim 3 wherein said porous metal is porous bronze.

References Cited

UNITED STATES PATENTS

| 1,679,772 | 8/1928 | Johnson | 287—87XR |
|---|---|---|---|
| 2,755,116 | 7/1956 | Alldredge. | |
| 2,846,252 | 8/1958 | Herbenar et al. | |
| 2,860,899 | 11/1958 | Gottschald. | |
| 2,937,895 | 5/1960 | Langen et al. | 287—87 |
| 3,041,094 | 6/1962 | Herbenar | 287—87 |
| 3,363,921 | 1/1968 | Gottschald. | |

FOREIGN PATENTS 902,244  8/1962  Great Britain.

DAVID J. WILLIAMOWSKY, Primary Examiner

A. V. KUNDRAT, Assistant Examiner

U.S. Cl. X.R.

287—21